United States Patent

Lakra

[11] Patent Number: 6,057,771
[45] Date of Patent: May 2, 2000

[54] FLUID DELIVERY APPARATUS

[75] Inventor: Paul Lakra, Wembley, United Kingdom

[73] Assignee: Planer Products Ltd., Sunbury, United Kingdom

[21] Appl. No.: 09/102,237

[22] Filed: Jun. 22, 1998

[30] Foreign Application Priority Data

Jun. 24, 1997 [GB] United Kingdom .................. 9713194

[51] Int. Cl.[7] .................................................. G08B 21/00
[52] U.S. Cl. ........................ 340/611; 340/626; 340/605; 137/551; 137/554; 137/557
[58] Field of Search ................... 340/611, 626, 340/605; 137/554, 557, 551, 613; 222/41

[56] References Cited

U.S. PATENT DOCUMENTS 5,057,822  10/1991  Hoffman ................................ 340/611
5,439,355   8/1995  Jimison et al. ........................ 417/63
5,539,384   7/1996  Frasier .................................. 340/605

*Primary Examiner*—Julie Lieu
*Attorney, Agent, or Firm*—James B. Middleton

[57] ABSTRACT

A line, especially for delivery of liquefied gas at ambient temperature, has two solenoid valves connected in series with an intermediate section of the line between them. In normal operation when both valves are closed, the isolated intermediate section contains liquid which absorbs heat from the atmosphere and/or from a heater, and the resulting increase in pressure is detected by a pressure sensor. If either valve fails to close fully to shut off flow, the intermediate section is not then isolated, so the absence of a signal from the sensor (the valves being set to close fully) indicates that at least one of them has not properly closed, and an alarm is given.

7 Claims, 1 Drawing Sheet

FLUID DELIVERY APPARATUS

BACKGROUND OF THE INVENTION

1. Field of the Invention

This invention relates to fluid delivery apparatus including a flow line for delivery of fluid through the flow line from a source to an outlet, with flow control means, for controlling the delivery of the fluid, being connected in the flow line.

The fluid may be in the form of a liquid, gas, or vapor, or a mixture of any one or more of these. However, the invention is especially applicable to use with liquids, and, among these, those liquids which have a boiling point below ambient temperatures.

2. Discussion of the Prior Art

Liquefied gas is widely used in research in industry and in medicine, including for example liquid oxygen, nitrogen, carbon dioxide, helium, or air. These cooled liquids are usually dispensed as needed from large vessels into smaller containers or other apparatus, through a flow line in the form of a hose or pipe, often with one or more in-line taps or valves to control the flow. The operation of such taps or valves may be automatic, that is to say they may be controlled electronically, electrically, or mechanically. In conventional practice, a single solenoid valve is placed in series in the fluid flow line to enable the flow to be initiated or shut off as required. It can easily be seen that the consequences of failure of such a valve may be serious; though relatively rare, such failures, in particular failure to close, provide real hazards to operators, as well as to materials being handled.

The catastrophic consequences of valve failure can be mitigated by the use of two valves in series instead of only a single valve. This is a well known technique in the gas industry, in which the valves are typically solenoid valves. However, failure of one of the valves can remain undetected until the other valve fails, because until this happens the failure of the first valve is masked by the one still operating.

SUMMARY OF THE INVENTION

An object of the present invention is to provide improved protection against the hazards inherent in conventional fluid delivery apparatus. In particular, the invention aims to provide timely warning of failure of a valve to close when it should have closed.

According to the invention in a first aspect, there is provided a method of detecting failure of a valve to close fully in a fluid delivery apparatus including a flow line for delivery of a fluid and two closable valves interconnected in series through an intermediate section of the flow line, the method comprising the steps of:

(a) putting both valves in a fully-closed setting;

(b) detecting the fluid pressure in the intermediate section; and, (c) initiating an alarm condition, but only if the said pressure fails to change in a predetermined way, whereby the alarm condition is responsive to failure of at least one of said valves to close fully.

The expression "initiating an alarm condition" is to be understood to mean the taking of any action or series of actions that may be required as a consequence of the failure of the valve to close. This may simply consist in giving audible or visual warning. Alternatively or in addition, it may comprise the automatic isolation of the flow line from the liquid source in any suitable way. In this specification, references to an alarm condition are to be read accordingly.

In the general method of the invention, the alarm condition will apply only when at least one of the valves is in a fully closed setting, that is to say when it is intended to be, but is in fact not, fully closed. It is important here to appreciate the difference between a closed setting, which represents a command, and a closed condition, which represent the actual state of the valve in obedience to that command.

The invention depends on changes in pressure in the fluid contained in the intermediate section. In this connection, use is made of the fact that the intermediate section is isolated if both valves are properly in their closed condition, but not if either one of them has failed to close properly. If the intermediate section is isolated, pressure can be enabled, i.e. allowed or (more particularly) caused, to build up as a result of an increase in temperature of the fluid isolated in that section. Such an increase in temperature, and therefore pressure, will generally be caused by transfer of the heat into the fluid in the intermediate section of the flow line.

We have found, surprisingly, that if both valves are closed simultaneously, or if the upstream valve is closed before the downstream one, a back pressure is set up in the flow line which is undesirable. Therefore according to a preferred feature of the invention, in step (a) the downstream valve is put in the said setting before the upstream valve.

Where the liquid is a liquefied gas below ambient temperature, having a boiling point below ambient, it will vaporize in the isolated intermediate section, giving rise to a significant increase in pressure. Thus, according to a preferred feature of the invention, the alarm condition is initiated if, and only if, the pressure fails to increase to a predetermine value, which may for example be the vapor pressure of the fluid.

Step (c) may consist in initiating the alarm condition if the pressure fails to reach the predetermined value, or fails to reach such value in a predetermined time, or it fails to rise at a predetermined rate. In order that the failure of a valve to close can be detected as early as possible, the method of the invention preferably includes the further steps of applying heat, using suitable a heater, to the intermediate section to raise the pressure of the fluid therein when both of the said valves are in the fully closed setting.

It may be mentioned here that, in the case where the fluid being delivered is a cryogenic liquid, at a temperature substantially below ambient, the heating effect may be due solely or partially to the natural leakage of heat from the atmosphere into the interior of the intermediate section. In this connection, however well the flow line is lagged, the thermal insulation of the latter will never be perfect in practice.

According to the invention in a second aspect, fluid delivery apparatus includes a flow line for delivery of fluid, two closable valves interconnected in series through an intermediate section of the flow line, and a pressure sensor for giving signals in response to changes in fluid pressure in the intermediate section.

The apparatus preferably further includes signal processing means connected to the sensor and responsive to operation of the valves, being adapted for initiating an alarm condition in the absence of a signal from the sensor, representing a predetermined change in the said pressure, when at least one of the said valves has failed to obey a command to fully close. Preferably in that case, the apparatus includes valve control means defining settings of the valves, including a fully-closed setting, and the valve control means when the valves are put in their fully closed setting.

Preferably, the apparatus further includes heating means adjacent to the intermediate section, for heating fluid in the latter.

BRIEF DESCRIPTION OF THE DRAWINGS

These and other features of the invention will be better understood on a reading of the following description of some preferred embodiments of the invention, given by way of non limiting example and with reference to the accompany drawings in which.

DETAILED DESCRIPTION OF THE EMBODIMENTS

Figure 1:
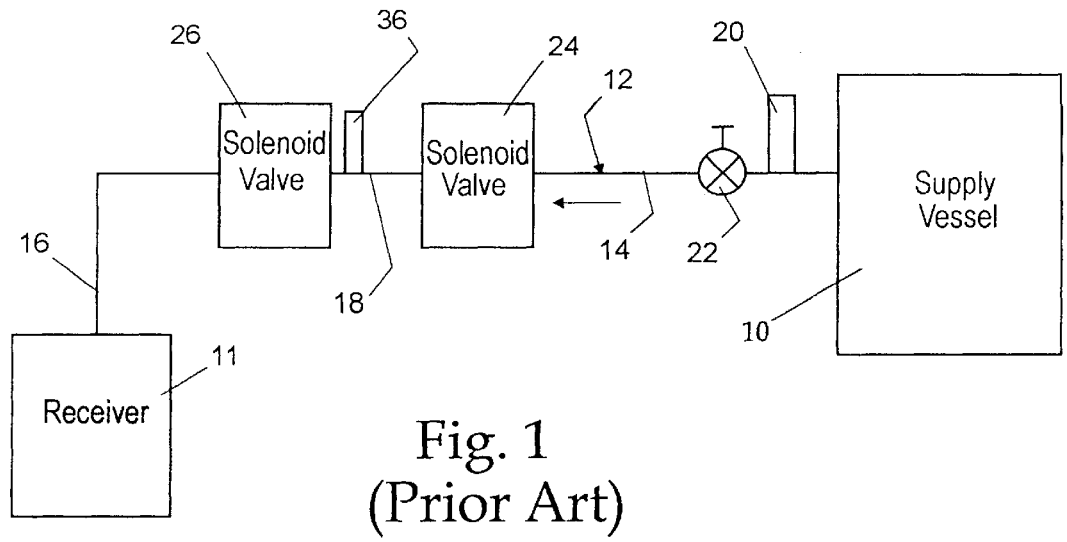
FIG. 1 is a diagram showing essential features of a typical simple conventional fluid delivery apparatus; and, FIG. 2 shows diagrammatically the means for controlling fluid flow in a fluid delivery apparatus according to the present invention.

In the prior art arrangement shown in FIG. 1, a fluid is delivered from a supply vessel 10 to a receiver 11 through a flow line 12 comprising an upstream section 14, a downstream section 16, and an intermediate section 18 joining the section 14 and 16 and containing a safety valve 36. The upstream section 14 contains a safety valve 20 associated with the supply vessel, and a manually operated main shut-off valve 22. Two solenoid valves 24 and 26 are fitted in the flow line 12 at the upstream and downstream end of intermediate section 18, respectively. The valves 24 and 26 are thus in series, so that, although failure of one of these valves to close when it should will not prevent the delivery of fluid from being stopped by the other one so long as the latter is still working correctly, the failure of one valve may not be noticed until the second one also fails, as discussed above.

Figure 2:
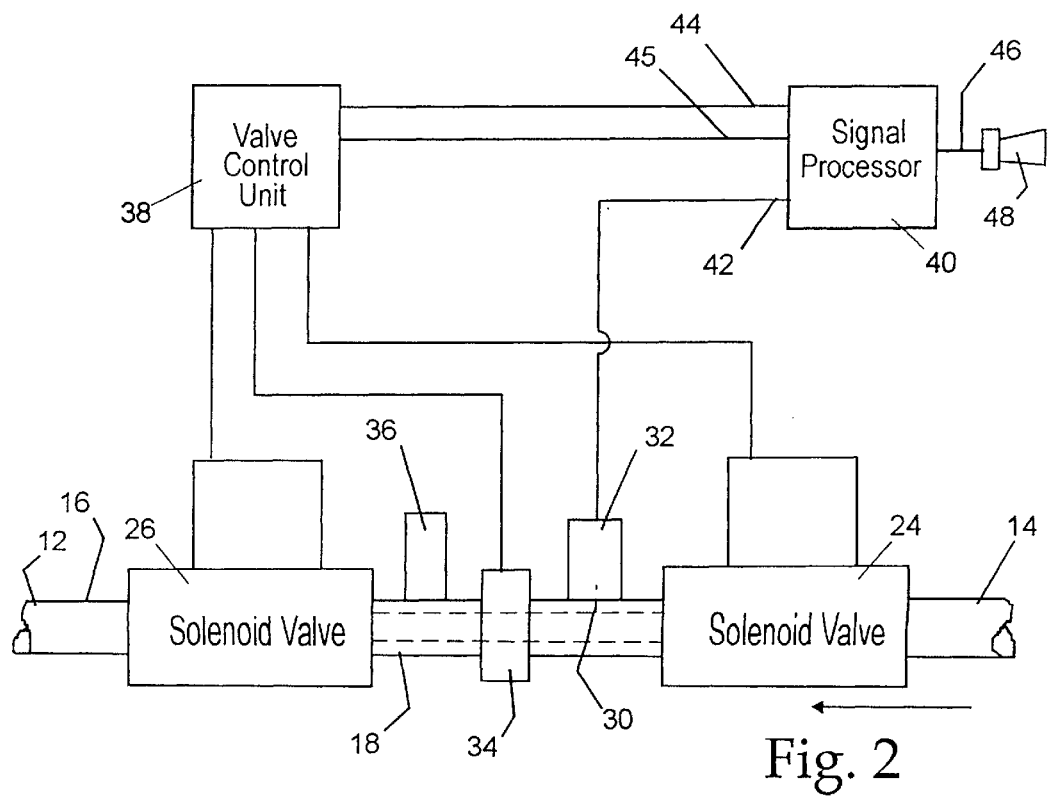

The apparatus, of which only one part is shown in FIG. 2, is the same as that in FIG. 1 except in the region of the intermediate section 18 of the flow line 12. The intermediate section 18 is a small bore pipe section containing a pressure switch 32. A heater 34 is fitted to the section 18 for heating the latter and therefore also the fluid within it. As shown, the heater 34 is an electric heater, but it may take any suitable form. A safety valve 36 is again carried by the intermediate section 18.

Although the valves 24 and 26 in this example are solenoid valves, they may of course take any other suitable form. These valves are actuated by a valve control unit 38, which puts each valve selectively in a fully-open setting and a fully-closed setting by energizing and deenergizing the solenoid of each valve. It may also have a facility for intermediate settings of the valve if required.

The valve control unit 38 is arranged to close the downstream valve 26 before it closes the upstream valve 14. For this purpose it may include a time delay circuit to initiate the closing of valve 24 as soon as the valve 26 has been put in fully-closed setting.

Where the heater 34 is an electrical heater, as in this example, the valve control unit, which has an output connected to the heater, is arranged to energize the latter when both valves 24 and 26 are in their fully-closed settings, but preferably only for a predetermined time starting when the valves are put in those settings.

The pressure switch 32 is connected to a signal processor 40 through a first input 42 of the signal processor 40. The signal processor 40 has further inputs 44 and 45 connected to corresponding further outputs of the valve control unit 38; and, an output 46 is connected to a warning device (referred to herein as an alarm) 48. The valve control unit 38 is arranged to deliver a signal to each input 44 and 45 of the signal processor when the valves 26 and 24, respectively, are in their fully-closed setting. The processor 40 can thus monitor the setting of each valve.

The signal processor 40 is adapted to give an output at 46, to operate the alarm, only when a signal is present on both its inputs 44 and 46 (indicating both valves are in their fully closed setting), with no pressure signal on its input 42. Normally the processor 40 is also arranged to delay giving its signal at 46 after lapse of a predetermined time, as will be discussed later herein. The pressure signal from the sensor 30 to the input 42 is absent at least when the section 18 has not been properly isolated by virtue of the valves 24 and 26 being in their fully-closed condition.

Operation of the apparatus of the invention to deliver liquid nitrogen from the supply vessel 10 to the receiver 11, as indicated by the arrow, will now be described with reference to FIG. 2.

To begin the operation of filling the receiver 11, with the main shut-off valve 22 fully open, the solenoid valves 24 and 26 are opened by the unit 38 so the liquid nitrogen flows through the flow line 12 as indicated by the arrow. When the receiver 11 is full, the unit 38 puts the downstream valve 26, and then the upstream valve 24, in their fully closed settings, and the inputs 44 and 45 receive in succession a signal from the control unit 38. At the same time the heater 34 is energized.

If both valves are operating correctly, the valve 26 goes into its fully closed condition, and the valve 24 subsequently goes into its fully closed condition, thus isolating the intermediate section 18. Heat supplied by the heater 34 enters the intermediate section 18 and heats the liquid nitrogen contained in it. If the latter reaches its boiling point, continued ingress of heat will result in vaporization. In general terms, heating the fluid produces a substantial increase in the fluid pressure; this is detected by the sensor 30, which delivers a signal to the processor 40 (input 42).

Thus, in this situation, signals are present on both inputs 42 and 44 of the processor 40, because both valves are not only in their fully closed setting, but they are also in fact fully closed. The alarm 48 is therefore not actuated. The safety valve 36 limits the build-up of pressure within the section 18.

However, if either valve 24 or 26 fails to achieve its fully-closed condition when put in its fully closed setting, the section 18 is not isolated, and any increase in pressure in the liquid in it will be vented towards the supply vessel 10 or the free end of the downstream section 16 of the flow line (connected to the receiver 10), depending on which valve has failed. The pressure in the section 18 will then not rise by a great enough amount (or by a great enough amount in a predetermined time) to cause the pressure switch to give a signal to the signal processor 40. The latter therefore has a signal on its input 44, but not on its input 42; this is the condition for operating the alarm 48, thereby warning the operator of a fault.

In a particular example where apparatus of the above kind is used for delivery of liquid nitrogen, the bursting pressure of all the pipe line elements is a minimum of 16.5 bar. In practice, the intermediate section will have a much higher bursting pressure than this, because of its design and its small internal diameter, as compared with the upstream section 14, for example. The actual supply pressure in the vessel 10 is regulated to 2–3 bar. The supply end safety valve 20 is set at 10 bar, and the safety valve 36 at 3.5 bar, while the pressure switch 32 is set at 2 bar. Other values may be more appropriate in different situations.

It will of course be understood that the apparatus as described above is capable of numerous modifications or variations. For instance, the liquid being delivered may be a liquid with a boiling point above normal ambient temperatures, in which case the heater will be used to raise the temperature of the fluid to its boiling point. In practice, the temperatures achievable are limited only by the temperature limitations of the valves.

Further pressure sensors (not shown) may be fitted in the line 12 upstream of the valve 24 and downstream of the valve 26, and connected to the processor 40. The processor 40 will then be adapted to compare changes in fluid pressure in the flow line sections 14 and 16 with those in the section 18. This comparison can then be used for deducing whether it is the valve 24 or the valve 26 (or both) that has failed to close properly.

The warning device may be visual or audible or both. It may be linked to some suitable means for shutting off flow of the fluid automatically. Such an automatic shut-off would then be part of the "alarm condition".

Although provision of a warning device is highly desirable, it is not essential if an automatic shut-off device is provided. Such a device may be independent, such as an automatic valve or valves for closing the flow line at one or both ends in response to the output signal from the processor representing an alarm condition.

It will be understood that the valve control unit 38 and signal processor 40 in FIG. 2 and their connections are purely illustrative. Any suitable means for carrying out these functions may be provided.

In general terms, in the method and apparatus of the invention, the alarm condition is initiated only if the fluid pressure in the intermediate section fails to change in a predetermined way. In other words, parameters for the changes in this pressure to trigger the alarm condition are predetermined, but there is a wide choice as to both the nature and the actual values of these parameters, and the relationship between them. For example, it is desirable to be reasonably sure that there is no fault situation if an alarm has not been given within a quite short predetermined time after the valves have been (supposedly) closed. Otherwise the operator may switch off the power, or go away, before the pressure has had time to build up properly in the intermediate section of the flow line.

The heater may for example be controlled in such a way that the fluid will always be known to vaporize within a given time provided the intermediate section is isolated. A visual indicator, such as a green light, may be provided for indicating that the test for valve failure has been completed, with no failure being detected. This may be applied whether or not a time limitation is required.

To prevent false alarms before the pressure sensor has had a chance to respond or otherwise to the predetermined changes in pressure, a suitable time delay means is preferably incorporated in the apparatus, for example a timing circuit in the valve control unit, which only allows the latter to give an output signal to the signal processor 40 after lapse of a predetermined time. Such a timing circuit may be part of the signal processor, delaying the output signal at 46 by a predetermined time.

The processor 40 may readily be adapted to respond to the rate of increase of fluid pressure in the section 18, so that a signal is given at 46 if this rate fails to reach a given value.

All of the various predetermined parameters can be determined by suitable experiment.

What is claimed a invention is:

1. In a fluid delivery apparatus comprising: a flow line for delivery of a fluid through said flow line, the flow line comprising an upstream, section downstream, and an section intermediate section between said upstream and downstream sections: a closable upstream valve and a closable downstream valve, said valves being interconnected in series in the flow line through said intermediate section, a method of detecting a failure of a said valve to close fully wherein said method comprises the steps of:
   (a) putting both said valves in a fully-closed setting;
   (b) detecting the pressure of said fluid in the intermediate section; and,
   (c) initiating an alarm condition, but only if the said pressure fails to change in a predetermined way,
      wherein step (a) comprises putting the downstream valve in said fully-closed setting before putting the upstream valve in said fully-closed setting,
      whereby the alarm condition is responsive to failure of at least one of the said valves to close fully.

2. In a fluid delivery apparatus comprising: a flow line for delivery of a fluid through said flow line, the flow line comprising an upstream section, a downstream section, and an intermediate section between said upstream and downstream sections; a closable upstream valve and a closable downstream valve, said valves being interconnected in series in the flow line though said intermediate section, method of detecting a failure of a said valve to close fully wherein said method comprises the steps of:
   (a) putting both said valves in a fully-closed setting;
   (b) detecting the pressure of said fluid in the intermediate section; and,
   (c) initiating an alarm condition, but only if the said pressure fails to change in a predetermined way,
      whereby the alarm condition is responsive to failure of at least one of the said valves to close fully, and wherein the alarm condition is initiated if said pressure fails to increase at a predetermined rate.

3. In a fluid delivery apparatus comprising: a flow line for delivery of a fluid through said flow line, the flow line comprising an upstream section, a downstream section, and an intermediate section between said upstream and downstream section; a closable upstream valve and a closable downstream valve, said valve being interconnected in series in the flow line through said intermediate section, a method of detecting a failure of a said valve to close fully wherein said method comprises the steps of:
   (a) putting both said valves in a fully-closed setting;
   (b) detecting the pressure of said fluid in the intermediate section; and,
   (c) initiating an alarm condition, but only if the said pressure fails to change in a predetermined way,
      whereby the alarm condition is responsive to failure of at least one of the said valves to close fully, and including the further step of heating the intermediate section of the flow line so as to raise the pressure of said fluid therein when both of the said valves are in the fully-closed setting.

4. In a fluid delivery apparatus comprising: a flow line for delivery of a fluid through said flow line, the flow line comprising an upstream section, a downstream section, and an intermediate section between said upstream and downstream sections; a closable upstream valve and a closable downstream valve, said valves being interconnected in series in the flow line through said intermediate section, and automatic shut-off means for automatically shutting off flow of the fluid, a method of detecting a failure of a said valve to close fully wherein said method comprises the steps of:
   (a) putting both said valves in a fully-closed setting;

(b) detecting the pressure of said fluid in the intermediate section with both said valves in a fully-closed setting; and, (c) initiating an alarm condition, but only if the said pressure of said fluid in the intermediate section fails to change in a predetermined ways, whereby the alarm condition is responsive to failure of at least one of the said valves to close fully wherein step (c) comprises automatic actuation of said shut-off means.

5. Fluid delivery apparatus comprising: a flow line for delivery of a fluid through said flow line, the flow line comprising an upstream section, a downstream section, and an intermediate section between said upstream and downstream sections; a closable upstream valve and a closable downstream valve, said valves being interconnected in series in the flow line through said intermediate section, wherein the apparatus further includes a pressure sensor in said intermediate section for giving signals in response to change in fluid pressure in the intermediate section, and further including signal processing means connected with the sensor and responsive to the setting of each said valve, said processing means being adapted for initiating a said alarm condition in the absence of a signal from the sensor representing a predetermined change in the said pressure, when at least one of the said valves has failed to obey a command to close fully.

6. Apparatus according to claim 5, further including valve control means for controlling settings of said valves, said settings including a fully-closed setting of each valve, wherein the valve control means are adapted to pass a signal to the signal processing means when each valve is put in its fully-closed setting.

7. Fluid delivery apparatus comprising: a flow line for delivery of a fluid through said flow line, the flow line comprising an upstream section, downstream section, and an intermediate section between said upstream and downstream sections; a closable upstream valve and a closable downstream valve, said valves being interconnected in series in the flow line through said intermediate section, wherein the apparatus further includes a pressure sensor in said intermediate section for giving signals in response to changes in fluid pressure in the intermediate section, and further including heating means adjacent to the intermediate section, for heating fluid in the latter.

* * * * *